United States Patent

Sambonsugi

(10) Patent No.: US 9,625,787 B2
(45) Date of Patent: Apr. 18, 2017

(54) FOCUS DETECTION APPARATUS, FOCUS DETECTION METHOD AND PROGRAM, AND IMAGING APPARATUS

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 14/252,118

(22) Filed: Apr. 14, 2014

(65) Prior Publication Data
US 2014/0313371 A1   Oct. 23, 2014

(30) Foreign Application Priority Data

Apr. 17, 2013 (JP) ................................ 2013-086767

(51) Int. Cl.
 *H04N 5/232* (2006.01)
 *G03B 13/36* (2006.01)
 *G02B 7/36* (2006.01)

(52) U.S. Cl.
CPC ......... *G03B 13/36* (2013.01); *H04N 5/23212* (2013.01)

(58) Field of Classification Search
CPC ...... H04N 5/23212; G03B 13/36; G02B 7/36; G02B 7/365
USPC .......... 348/345, 349, 350, 353; 396/114, 89, 396/121
See application file for complete search history.

(56) References Cited

U.S. PATENT DOCUMENTS

| 5,467,163 A * | 11/1995 | Uchiyama ................ G02B 7/36 396/121 |
| 8,018,524 B2 | 9/2011 | Kawarada |
| 8,675,121 B2 * | 3/2014 | Yamasaki ................ G02B 7/34 348/345 |
| 9,019,424 B2 | 4/2015 | Kimura et al. |

(Continued)

FOREIGN PATENT DOCUMENTS

| EP | 1085751 A2 | 3/2001 |
| JP | 2009-115893 A | 1/2001 |

(Continued)

OTHER PUBLICATIONS

Office Action dated Jan. 31, 2017, in Japanese Patent Application No. 2013-086767.

*Primary Examiner* — Tuan Ho
*Assistant Examiner* — Marly Camargo
(74) *Attorney, Agent, or Firm* — Fitzpatrick, Cella, Harper & Scinto

(57) ABSTRACT

A focus detection apparatus for performing a focus detection on the basis of pixel data of an object obtained from an imaging unit having pupil dividing means of a photographing optical system, Sets a focus detection area divided into division areas and a plurality of different first areas for deciding a focus state in the focus detection area, arithmetically operates first correlation data from the pixel data with respect to the object image of each division area to hold into a memory, adds the first correlation data of the division areas included in each first area read out from the memory, generates second correlation data of each first area, And discriminates focus states of a plurality of first areas in predetermined order on the basis of the second correlation data of each first area.

15 Claims, 19 Drawing Sheets

(56) References Cited

U.S. PATENT DOCUMENTS

| | | | |
|---|---|---|---|
| 9,279,955 B2 | 3/2016 | Kimura et al. | |
| 2003/0123871 A1* | 7/2003 | Yoshida | G02B 7/34 396/123 |
| 2009/0256952 A1* | 10/2009 | Kusaka | G02B 27/16 348/349 |
| 2010/0013947 A1* | 1/2010 | Oikawa | H04N 5/23212 348/222.1 |
| 2013/0076970 A1* | 3/2013 | Kishi | G02B 7/34 348/349 |
| 2013/0147998 A1* | 6/2013 | Yoshimura | H04N 5/23212 348/302 |
| 2014/0104484 A1* | 4/2014 | Karasawa | H04N 5/23112 348/349 |
| 2014/0146218 A1* | 5/2014 | Kunieda | H04N 5/23212 348/345 |
| 2014/0347550 A1* | 11/2014 | Karasawa | H04N 5/23212 348/345 |

FOREIGN PATENT DOCUMENTS

| | | |
|---|---|---|
| JP | 2001-083407 A | 3/2001 |
| JP | 2001-324665 A | 11/2001 |
| JP | 2010-152161 A | 7/2010 |
| JP | 2013-025246 A | 2/2013 |

* cited by examiner

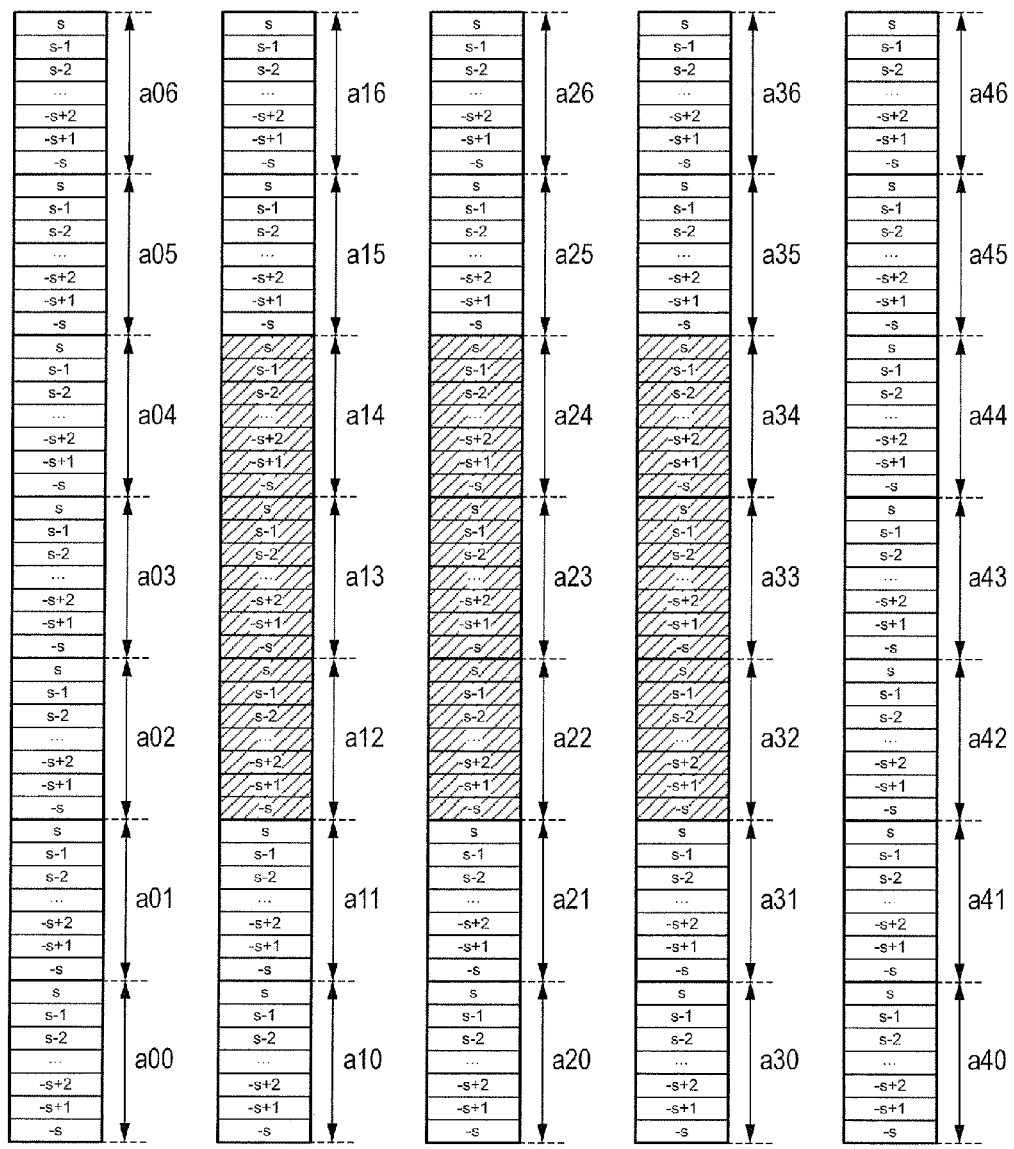

FIG. 13A

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 13B

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 13C

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 13D

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

(b20–b23, b30–b33, b40–b43 shaded)

FIG. 13E

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

(b23–b26, b33–b36, b43–b46 shaded)

FIG. 13F

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

(b26–b29, b36–b39, b46–b49 shaded)

FIG. 13G

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| *b40* | *b41* | *b42* | *b43* | b44 | b45 | b46 | b47 | b48 | b49 |
| *b50* | *b51* | *b52* | *b53* | b54 | b55 | b56 | b57 | b58 | b59 |
| *b60* | *b61* | *b62* | *b63* | b64 | b65 | b66 | b67 | b68 | b69 |

FIG. 13H

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | *b43* | *b44* | *b45* | *b46* | b47 | b48 | b49 |
| b50 | b51 | b52 | *b53* | *b54* | *b55* | *b56* | b57 | b58 | b59 |
| b60 | b61 | b62 | *b63* | *b64* | *b65* | *b66* | b67 | b68 | b69 |

FIG. 13I

| b00 | b01 | b02 | b03 | b04 | b05 | b06 | b07 | b08 | b09 |
|---|---|---|---|---|---|---|---|---|---|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | *b46* | *b47* | *b48* | *b49* |
| b50 | b51 | b52 | b53 | b54 | b55 | *b56* | *b57* | *b58* | *b59* |
| b60 | b61 | b62 | b63 | b64 | b65 | *b66* | *b67* | *b68* | *b69* |

FIG. 14A

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 14B

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 14C

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 14D

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | *b38* | *b39* |
| b40 | b41 | b42 | b43 | b44 | b45 | b46 | b47 | *b48* | *b49* |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 15A

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | *b26* | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FIG. 15B

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | *b27* | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

*FIG. 15C*

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

*FIG. 15D*

| b00 | b01 | b02 | b03 | b04 | b05 | b06 | b07 | b08 | b09 |
|-----|-----|-----|-----|-----|-----|-----|-----|-----|-----|
| b10 | b11 | b12 | b13 | b14 | b15 | b16 | b17 | b18 | b19 |
| b20 | b21 | b22 | b23 | b24 | b25 | b26 | b27 | b28 | b29 |
| b30 | b31 | b32 | b33 | b34 | b35 | b36 | b37 | b38 | b39 |
| b40 | b41 | b42 | b43 | b44 | b45 | b46 | b47 | b48 | b49 |
| b50 | b51 | b52 | b53 | b54 | b55 | b56 | b57 | b58 | b59 |
| b60 | b61 | b62 | b63 | b64 | b65 | b66 | b67 | b68 | b69 |

FOCUS DETECTION APPARATUS, FOCUS DETECTION METHOD AND PROGRAM, AND IMAGING APPARATUS

BACKGROUND OF THE INVENTION

Field of the Invention

The present invention relates to a focus detection apparatus for an autofocus function of an imaging apparatus and, more particularly, to a focus detection apparatus for performing a focus detection of a phase difference method by using an image signal from an imaging element having a pixel for focus detection on an imaging plane and to an imaging apparatus having such a focus detection apparatus.

Description of the Related Art

In the related arts, as a focus detection method for focus control of an imaging apparatus, various kinds of methods such as phase difference method using a focus detection element, contrast method using a contrast component of an image of an imaging element, and the like have been proposed. There is such a technique that by using an arrangement in which pixels of an imaging element receive rays of light of different pupil planes of an imaging lens, a focus detection of the phase difference method is performed simultaneously with the image pickup.

In Japanese Patent Application Laid-Open No. 2001-083407 (Patent Literature 1), a ray of light which is converged by one microlens in one pixel is photoelectrically converted by divided photodiodes (hereinbelow, referred to as "PDs"), thereby allowing each PD to receive the rays of light of different pupil planes of an imaging lens. By such a construction, the focus detection in the imaging lens is performed by comparing outputs from the two PDs.

In Japanese Patent Application Laid-Open No. 2010-152161 (Patent Literature 2), a wiring layer existing on a front surface of a PD is made different in dependence on a pixel, thereby allowing rays of light of different pupil planes of an imaging lens to be received.

According to those techniques, an image shift amount is detected, that is, a phase difference is detected from the signals of the respective PDs which received the rays of light of the different pupil planes of the imaging lens and a defocus amount is calculated from the image shift amount, thereby performing the focus detection.

In Japanese Patent Application Laid-Open No. 2009-115893 (Patent Literature 3), the focus detection is performed by using both of the method of Patent Literature 2 and the contrast method.

In the case of the focus detection of the contrast method, there is such a problem that if an area which is used for the focus detection is set to be small, when a defocus amount of an object is small, an S/N ratio deteriorates, while an accuracy is raised. When the defocus amount is large, a focus detection area does not fit in a blurred image. If the area which is used for the focus detection is set to be large, it may happen more frequently that a plurality of objects exist within the focus detection area, while the S/N ratio is improved. Therefore, a possibility of an erroneous detection increases by what is called a perspective conflict in which a remote object and a near object exist mixedly within the focus detection area. Although the perspective conflict also occurs in the phase difference method, according to the contrast method, since the image is obtained by the imaging element, a size of image also depends on not only a size of object but also the defocus amount, that is, what is called a size of blurred image. Therefore, it is necessary to select an optimum focus detection area also in dependence on a degree of blurring.

Also in the case where the focus detection of the phase difference method is performed in the imaging element, a size of area to which the image is projected also depends on the defocus amount. Particularly, the wider a division range of an exit pupil of a photographing lens is, the more its influence is remarkable.

In the phase difference detection on the imaging element of the type in which the ray of light is divided by the PDs as disclosed in Patent Literature 1, since the outputs of the PDs are also used in the photographed image, the division range of the exit pupil is optimized to the photographed image and cannot be reduced to a small area for focus detection. At this time, it is necessary to optimize the size of focus detection area in accordance with a focus state in order to decrease the perspective conflict. Therefore, there is such a problem that if a focus detection arithmetic operation is executed a plurality of number of times by changing the size of focus detection area, it takes a time until a final focus detection result is obtained. Since it is necessary to execute the arithmetic operation a plurality of number of times to the image, such a problem that a buffer to store the image is necessary also occurs.

The invention is made in consideration of the foregoing problems and it is an aspect of the invention to provide a focus detection apparatus and an imaging apparatus in which focus detection operation results in a larger number of different focus detection areas can be obtained by a smaller number of frames and a time which is required until an in-focus state is obtained can be shortened.

SUMMARY OF THE INVENTION

According to an aspect of the invention, there is provided a focus detection apparatus comprising: an obtaining unit configured to obtain pixel data of an object obtained by an imaging unit having pupil dividing means of a photographing optical system for forming an optical image of the object; a setting unit configured to set a focus detection area divided into a plurality of division areas and a plurality of different first areas to determine a focus state in the focus detection area; an arithmetic operation unit configured to arithmetically operate first correlation data with respect to an object image of each division area by using the pixel data; a memory configured to hold the first correlation data for every division area; a generation unit configured to generate second correlation data of each of the first areas by reading out the first correlation data of the division area included in each of the first areas from the memory and adding the read-out first correlation data; and a determining unit configured to determine the focus states of the plurality of first areas in predetermined order on the basis of the generated second correlation data of each of the first areas.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A and 10B are diagrams illustrating a construction of a focus detection area and the memory to store the correlation data in the focus detection area according to the first embodiment of the invention.

FIGS. 13A, 13B, 13C, 13D, 13E, 13F, 13G, 13H and 13I are diagrams illustrating a focus detection area according to the second embodiment of the invention.

FIGS. 14A, 14B, 14C and 14D are diagrams illustrating a focus detection area according to the second embodiment of the invention.

FIGS. 15A, 15B, 15C and 15D are diagrams illustrating a focus detection area according to the second embodiment of the invention.

DESCRIPTION OF THE EMBODIMENTS

Various exemplary embodiments, features, and aspects of the present invention will be described in detail below with reference to the drawings.

First Embodiment

Figure 1:
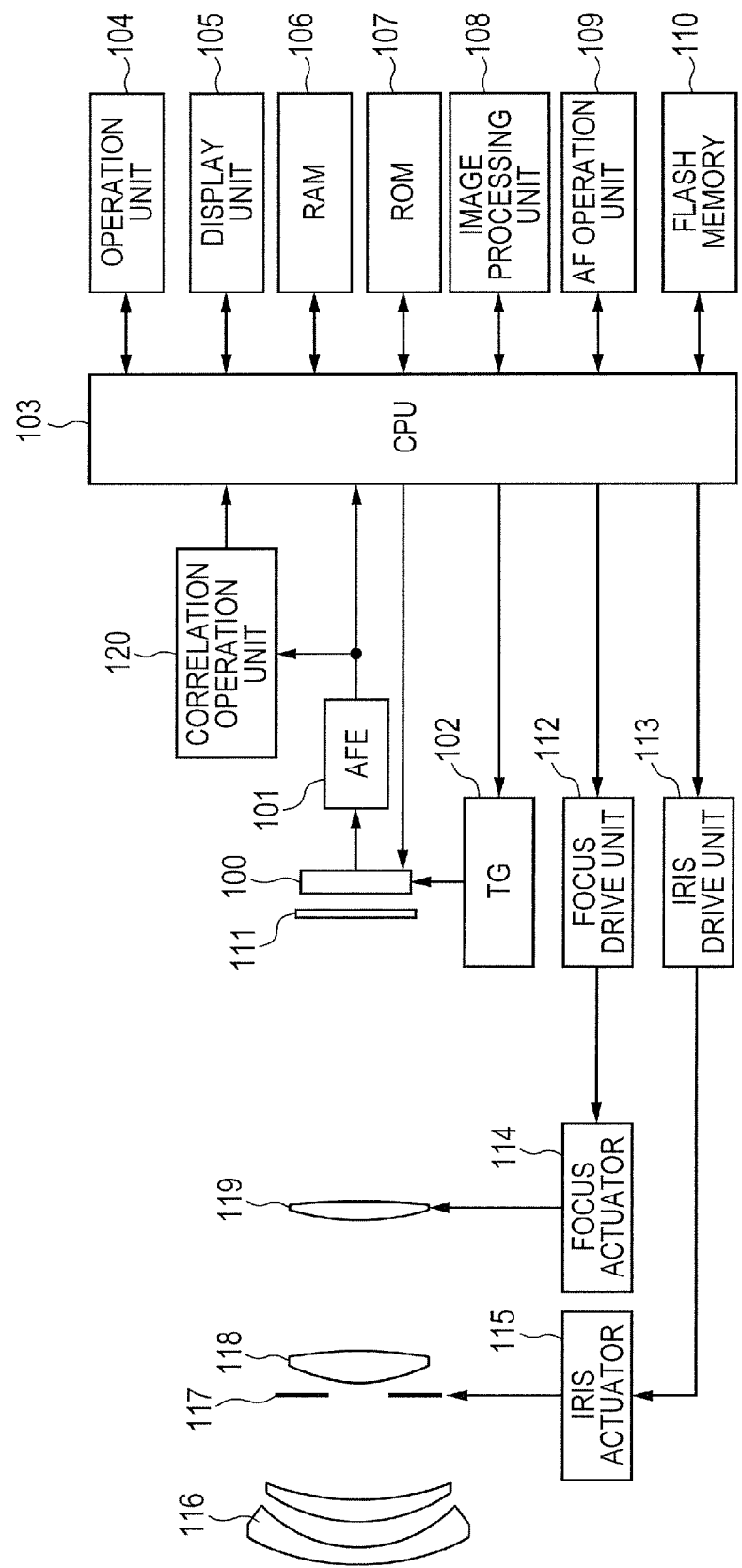
FIG. 1 is a diagram illustrating a construction of an imaging apparatus to which a focus detection apparatus according to the first embodiment of the invention is applied.

FIG. 1 is a block diagram illustrating a construction of an imaging apparatus to which a focus detection apparatus according to the first embodiment of the invention is applied. In the diagram, an imaging element 100 photoelectrically converts an optical image of an object formed by a photographing optical system into an electric signal. The imaging element 100 is controlled by a CPU 103 or the like, which will be described hereinafter, and photographs a still image or a moving image. An analog front end (hereinbelow, referred to as "AFE") 101 converts an analog image signal which is output from the imaging element 100 into a digital signal in correspondence to a gain adjustment and a predetermined quantization bit. A timing generator (hereinbelow, referred to as "TG") 102 controls drive timing of the imaging element 100 and AFE 101. Although the AFE 101 and TG 102 are arranged in the outside of the imaging element 100 in the present embodiment, they may be built in the imaging element.

A RAM 106 is provided. The RAM 106 has: a function of an image data storing unit for storing the digital image data converted by the AFE 101 and the image data processed by an image processing unit 108, which will be described hereinafter; and a function of a work memory at the time when the CPU 103, which will be described hereinafter, operates. Although those functions are executed by using the RAM 106 in the present embodiment, another memory can be also used so long as an access speed is sufficiently high and is at such a level that there is no problem on the operation. A ROM 107 stores a program which is loaded and executed by the CPU 103 in order to control the operation of each unit. Although a flash-ROM is shown as an example here in the present embodiment, another memory can be also used so long as an access speed is sufficiently high and is at such a level that there is no problem on the operation. The CPU 103 integratedly controls the imaging apparatus. As mentioned above, the CPU 103 executes the program to control the operation of each unit of the imaging element. The image processing unit 108 executes processings such as correction, compression, and the like of the photographed still image or moving image. The image processing unit 108 has an adding function of A-image data and B-image data, which will be described hereinafter, and a function of generating a still image or a moving image. A correlation operation unit 120 executes a correlation arithmetic operation by using a pixel signal which is output from the imaging element 100.

For a focus detection, an AF operation unit 109 executes the focus detection by using a result of the correlation operation which is output from the correlation operation unit 120. A detachable flash memory 110 is provided to record still image data and moving image data. Although the flash memory is used as a recording medium in the present embodiment, another memory such as data-writable non-volatile memory, hard disk, or the like may be used. Those recording media may be built in the apparatus. An operation unit 104 makes a setting of a photographing command, photographing conditions, and the like to the CPU 103. A display unit 105 displays the photograph still image and moving image, a menu, and the like.

A first lens group 116 is arranged at a front edge of a photographing optical system (common optical system) and is held movably backward and forward in the optical axis direction. An iris 117 is provided to adjust a light amount at the time of photographing by adjusting its aperture diameter. A second lens group 118 is provided. The iris 117 and the second lens group 118 integratedly move backward and forward in the optical axis direction and realize a magnification effect (zoom function) by an interlocking manner with the backward/forward motion of the first lens group 116. A third lens group 119 is provided to adjust a focal point of the photographing optical system by the backward and forward motion in the optical axis direction.

A focal plane shutter 111 is provided to adjust an exposure time at the time of still image photographing. Although the exposure time of the imaging element 100 is adjusted by the focal plane shutter in the present embodiment, the invention is not limited to such a construction but may be constructed in such a manner that the imaging element 100 has an electronic shutter function and the exposure time is adjusted by a control pulse. A focus drive unit 112 as a focus position change unit controls the driving of a focus actuator 114 on the basis of a result of the focus detection of the AF operation unit 109 and drives the third lens group 119 movably backward and forward in the optical axis direction, thereby performing the focus adjustment. An iris drive unit 113 controls the driving of an iris actuator 115 and controls an aperture of the iris 117. The correlation operation unit 120, AF operation unit 109, focus drive unit 112, and CPU 103 construct the focus detection apparatus according to the present embodiment.

Figure 2A:
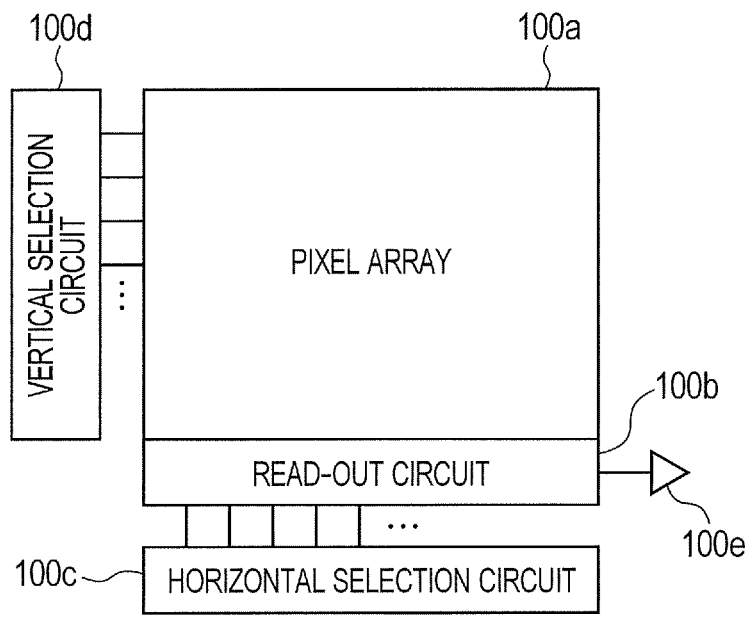
FIGS. 2A and 2B are diagrams illustrating a construction of an imaging element which is used in the imaging apparatus according to the first embodiment of the invention.

Subsequently, a construction of the imaging element 100 will be described with reference to FIGS. 2A and 2B. FIG. 2A illustrates the construction of the imaging element 100. In FIG. 2A, the imaging element 100 has: a pixel array 100a in which pixels are two-dimensionally arranged; a vertical selection circuit 100d to select a row of the pixels in the pixel array 100a; and a horizontal selection circuit 100c to select a column of the pixels in the pixel array 100a. The imaging element 100 further has a read-out circuit 100b to read out signals of the pixels selected by the vertical selection circuit 100d and the horizontal selection circuit 100c among the pixels in the pixel array 100a. The vertical selection circuit 100d selects a row in the pixel array 100a and, in the selected row, validates a read-out pulse which is output from the TG 102 based on a horizontal sync signal which is output from the CPU 103. The read-out circuit 100b is provided every column, has an amplifier and a memory, and stores the pixel signals of the selected row into the memory through the amplifier. The pixel signals of one row stored in the memory are sequentially selected in the column direction by the horizontal selection circuit 100c and are output to the outside through an amplifier 100e. By repeating such an operation the number of times as many as the number of rows, the signals of all pixels are output to the outside.

Figure 2B:
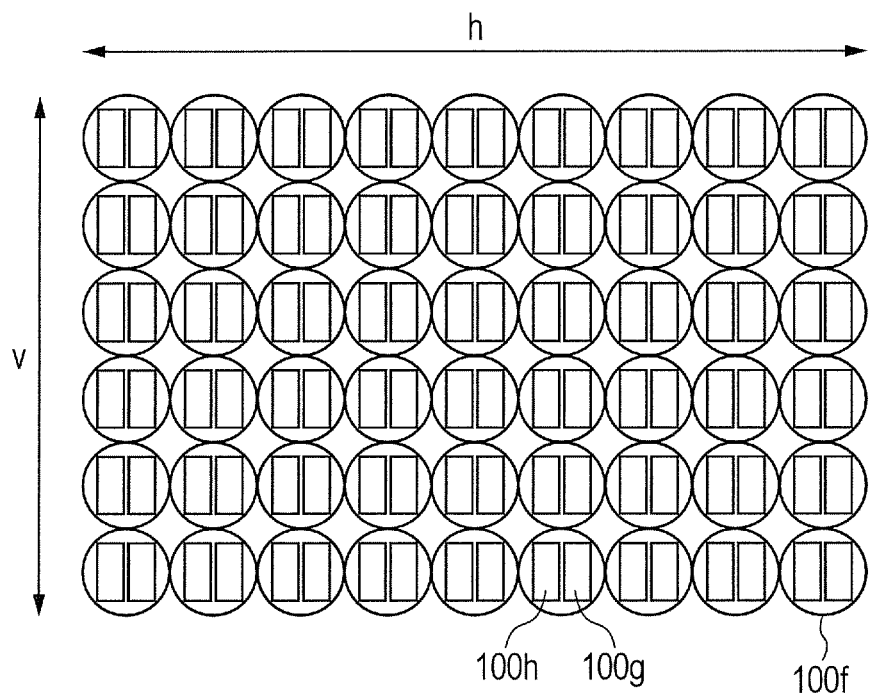

The pixel array 100a of the imaging element 100 is illustrated in FIG. 2B. In FIG. 2B, a microlens array is constructed by microlenses 100f. Photodiodes (PDs) 100g and 100h are photoelectric conversion units for performing a photoelectric conversion and construct an A-image photoelectric conversion unit and a B-image photoelectric conversion unit, which will be described hereinafter. Each pixel has such a construction that one microlens 100f is arranged over two PDs. That is, the pixel for focus detection has a plurality of photoelectric conversion units for one microlens. Assuming that an imaging area which shares the microlens 100f is one pixel, h pixels are arranged in the horizontal direction and v pixels are arranged in the vertical direction in the pixel array area. The signals accumulated in the PD 100g and PD 100h are separately output to the outside by the foregoing reading operation. Since different images having a phase difference enter the PD 100g and PD 100h by a pupil division construction, which will be described hereinafter, it is now assumed that the PD 100g is the A-image photoelectric conversion unit and the PD 100h is the B-image photoelectric conversion unit. Although the two PDs are arranged for one microlens in the present embodiment, the invention is not limited to such a construction. The invention can be also applied to a construction in which a plurality of PDs are vertically or horizontally arranged for one microlens.

Subsequently, pixel data which is generated from the pixel signals which are output from the A-image photoelectric conversion unit and the B-image photoelectric conversion unit of the imaging element 100 will be described with reference to FIGS. 3A and 3B. In the diagrams, substantially the same portions as those in FIGS. 2A and 2B are designated by the same reference numerals.

Figure 3A:
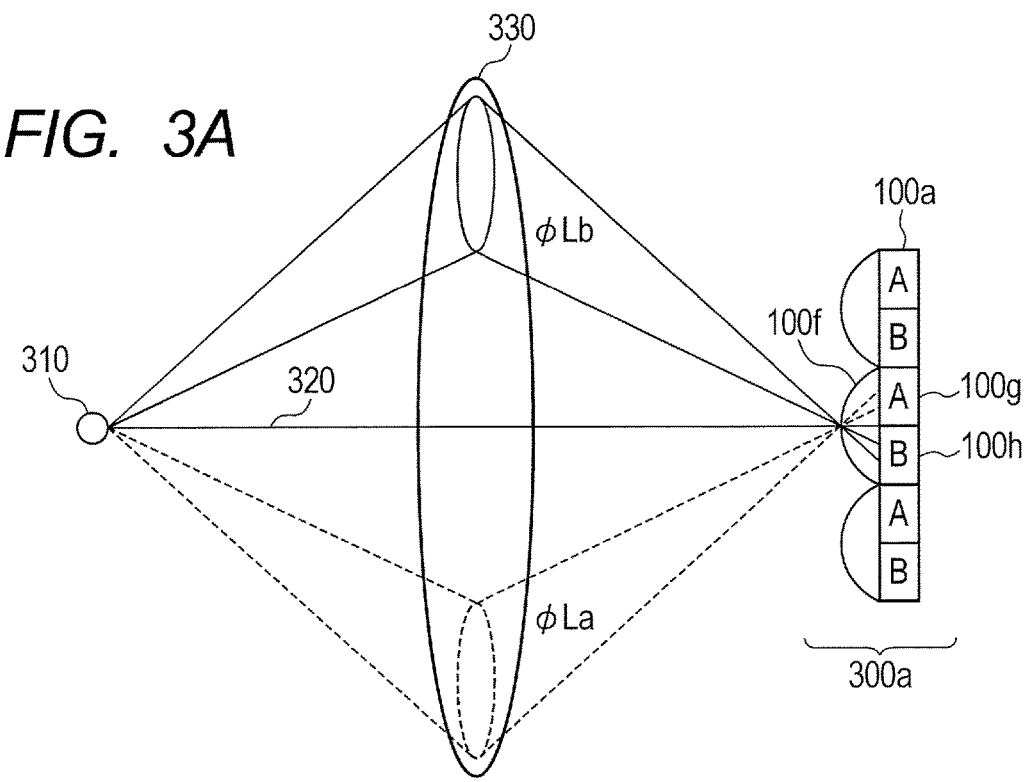
FIGS. 3A and 3B are diagrams illustrating a concept of a focus detection in a phase difference method.
Figure 3B:
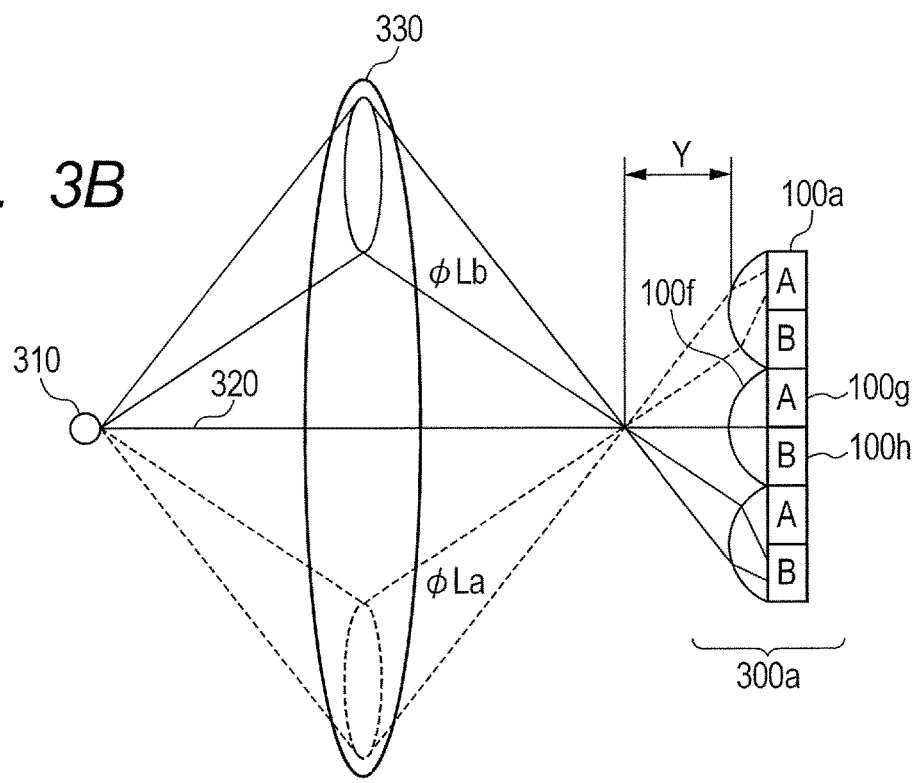

FIGS. 3A and 3B illustrate a relation between a focus state and a phase difference in the imaging element 100. In the diagrams, a cross section 300a of the pixel array 100a is illustrated. The foregoing microlens 100f, A-image photoelectric conversion unit 100g, and B-image photoelectric conversion unit 100h are provided. A photographing lens 330 is a lens when the first lens group 116, second lens group 118, and third lens group 119 illustrated in FIG. 1 are regarded as one lens. A ray of light emitted from an object 310 passes through each area of the photographing lens 330 while centering around an optical axis 320 and is focused onto the imaging element 100. It is assumed here that centers or centers of gravity of an exit pupil and the photographing lens are identical.

According to such a construction, a state when viewing the photographing optical system from the A-image photoelectric conversion unit and a state when viewing the photographing optical system from the B-image photoelectric conversion unit are equivalent to that of a pupil of the photographing optical system symmetrically divided with respect to the center. In other words, the light from the photographing optical system is what is called pupil-divided into two rays of light. The divided rays of light (first ray of light and second ray of light) enter the A-image photoelectric conversion unit 100g and B-image photoelectric conversion unit 100h serving as first photoelectric conversion unit and second photoelectric conversion unit for respectively receiving the pupil-divided rays of light. The first ray of light is a ray of light which passes through the first area of the exit pupil to be pupil-divided. The second ray of light is a ray of light which passes through the second area deviated from the first area of the exit pupil to be pupil-divided. In this manner, the light from a specific point on the object 310 is divided into a ray of light ΦLa and a ray of light ΦLb. The former is a ray of light which passes through the division pupil corresponding to the A-image photoelectric conversion unit 100g (A) and enters the A-image photoelectric conversion unit 100g (A). The latter is a ray of light which passes through the division pupil corresponding to the B-image photoelectric conversion unit 100h (B) and enters the B-image photoelectric conversion unit 100h (B).

Since those two rays of light enter from the same point on the object 310, in an in-focus state of the photographing optical system, as illustrated in FIG. 3A, they pass through the same microlens and reach one point on the imaging element. Therefore, the image signal which is obtained from the A-image photoelectric conversion unit 100g and the image signal which is obtained from the B-image photoelectric conversion unit 100h coincide. However, as illustrated in FIG. 3B, in a defocus state where a focal point is deviated by Y, arrival positions of both rays of light ΦLa and ΦLb are deviated by a change amount of incidence angles of the rays of light ΦLa and ΦLb into the microlens. Therefore, a phase difference occurs between the image signals which are obtained from the A-image photoelectric conversion unit 100g and the B-image photoelectric conversion unit 100h. Two object images having the phase difference are photoelectrically converted by the A-image photoelectric conversion unit 100g and the B-image photoelectric conversion unit 100h and are separately output to the outside (A-image signal and B-image signal). Those signals are converted into digital signals by the AFE 101 and are used for the AF operation, which will be described hereinafter, as A-image data and B-image data, which are pixel data.

Although the image signals are obtained by such a construction that a plurality of photoelectric conversion units are made to correspond to one microlens and the light is pupil-divided in the present embodiment, the invention is not limited to such a construction. The invention can be also applied to a construction in which the signals from the pixels for focus detection which are discretely-arranged are used.

Figure 4:
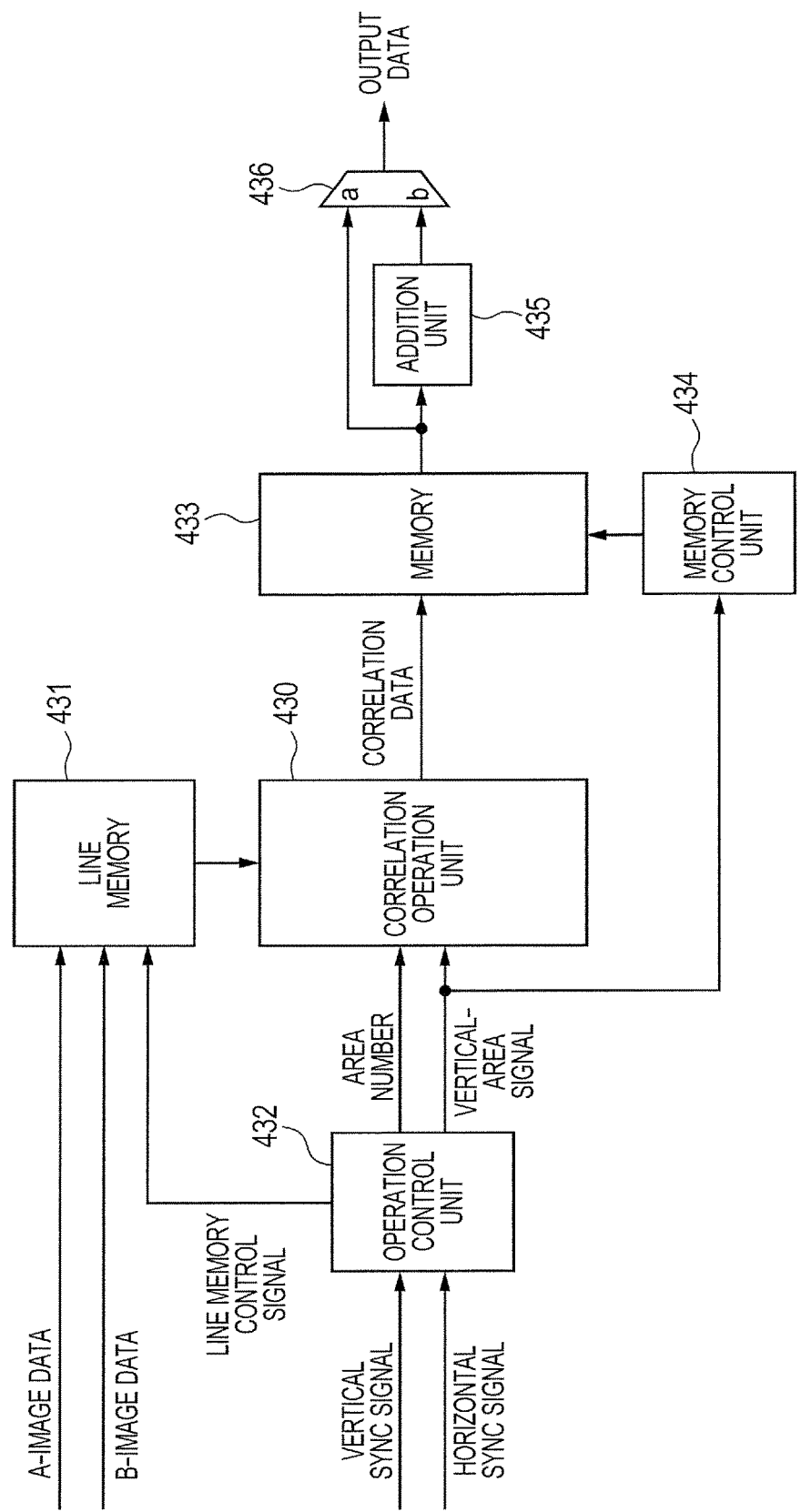
FIG. 4 is a diagram for describing a construction of a correlation operation unit of the focus detection apparatus according to the first embodiment of the invention.

Subsequently, a construction of the correlation operation unit 120 will be described with reference to FIG. 4. FIG. 4 is a diagram illustrating the construction of the correlation operation unit 120.

A correlation operation unit 430 calculates a phase difference (correlation value) between the A-image data and the B-image data which are input. A line memory 431 stores the A-image data and the B-image data of one row which are used in the correlation operation unit 430. An operation control unit 432 controls the operations of the line memory 431 and the correlation operation unit 430. A memory 433 stores a result of the correlation operation (correlation data) which is output from the correlation operation unit 430. A memory control unit 434 controls the writing of the correlation data into the memory 433 and the read-out of the correlation data from the memory 433. An addition unit 435 adds the correlation data which is output from the memory. A selector 436 is provided to select either the data which is output from the memory 433 or the data from the addition unit 435.

The operation of the correlation operation unit 120 will be described with reference to FIG. 4. The operation control unit 432 outputs a control signal to the line memory 431 on the basis of a horizontal sync signal, and the A-image data and the B-image data of one row which are input are written into the line memory 431. After that, the operation control unit 432 calculates a vertical position in one frame of the image data with reference to a vertical sync signal. Since the focus detection area (AF area) is preset by the CPU 103 in the present embodiment, when the calculated vertical position lies within the set area, the operation control unit 432 outputs a vertical area signal to the correlation operation unit 430. The correlation operation unit 430 executes a correlation operation to the A-image data and the B-image data when the vertical area signal is active.

On the basis of the set AF area, the operation control unit 432 reads out the A-image data and the B-image data at a position corresponding to the setting from the line memory 431 and inputs to the correlation operation unit 430.

Figure 7A:
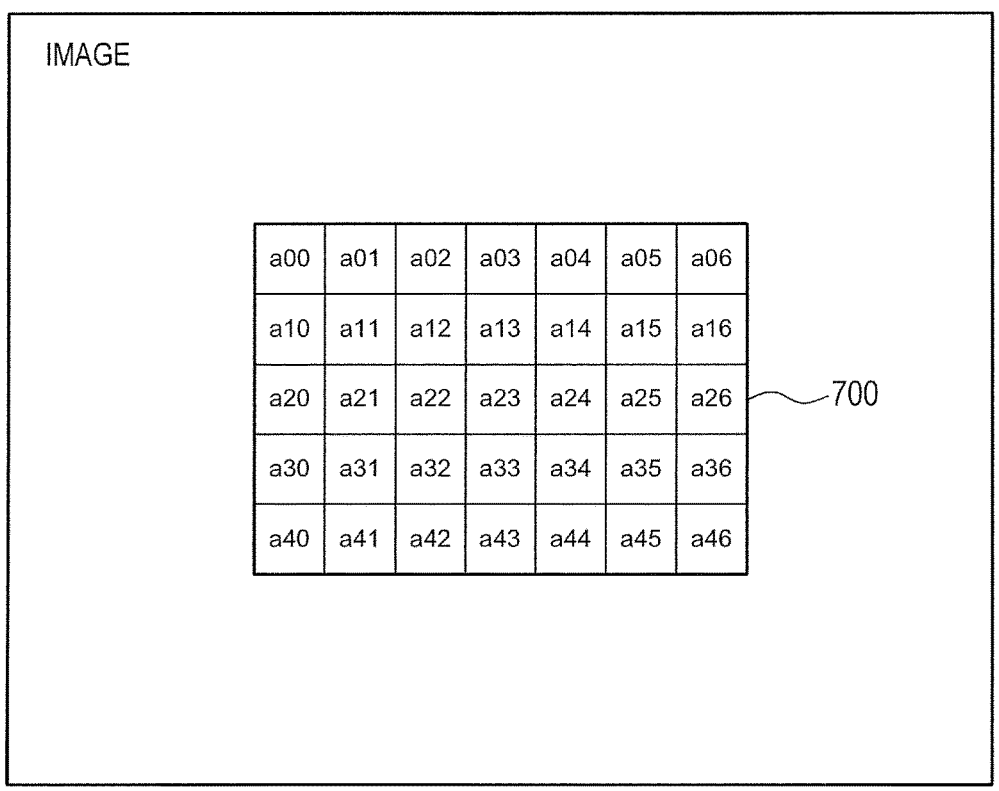
FIGS. 7A and 7B are diagrams illustrating a construction of a focus detection area and a memory to store correlation data in the focus detection area according to the first embodiment of the invention.

At this time, by the setting which is made to the operation control unit 432 by the CPU 103, the AF area is divided as illustrated in FIG. 7A with the notation of 700. On the basis of this setting, the operation control unit 432 outputs, to the correlation operation unit 430, an area number showing the data of which division area corresponds to the A-image data and the B-image data which are input. The correlation operation unit 430 executes a correlation operation every division area with reference to the area number. Although the area division in which the area is divided into seven areas in the horizontal direction and into five areas in the vertical direction is performed as an example in the present embodiment, the construction of the division is not limited to such an example. In the correlation operation unit 430, a correlation value between the A-image data and the B-image data is calculated.

Figure 5A:
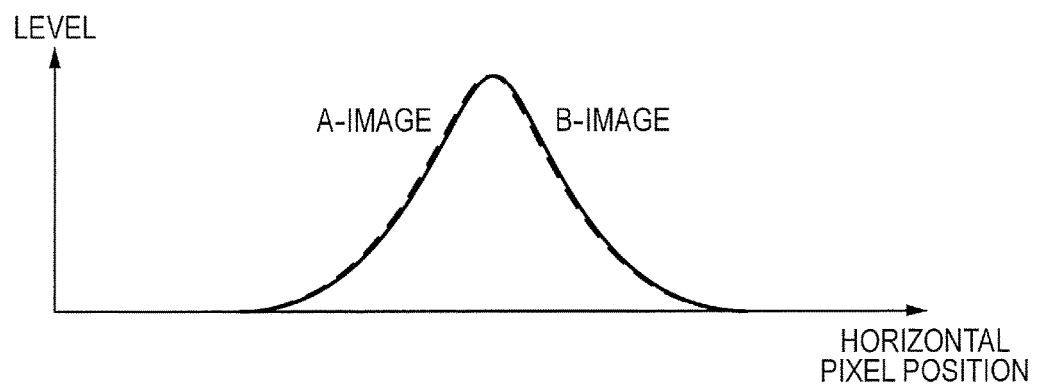
FIGS. 5A and 5B are diagrams illustrating a concept of the focus detection in the phase difference method.
Figure 5B:
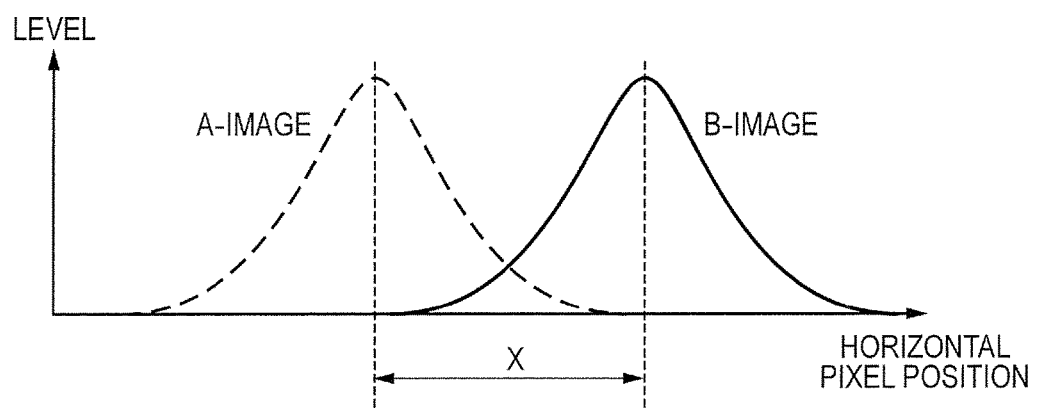
Figure 6A:
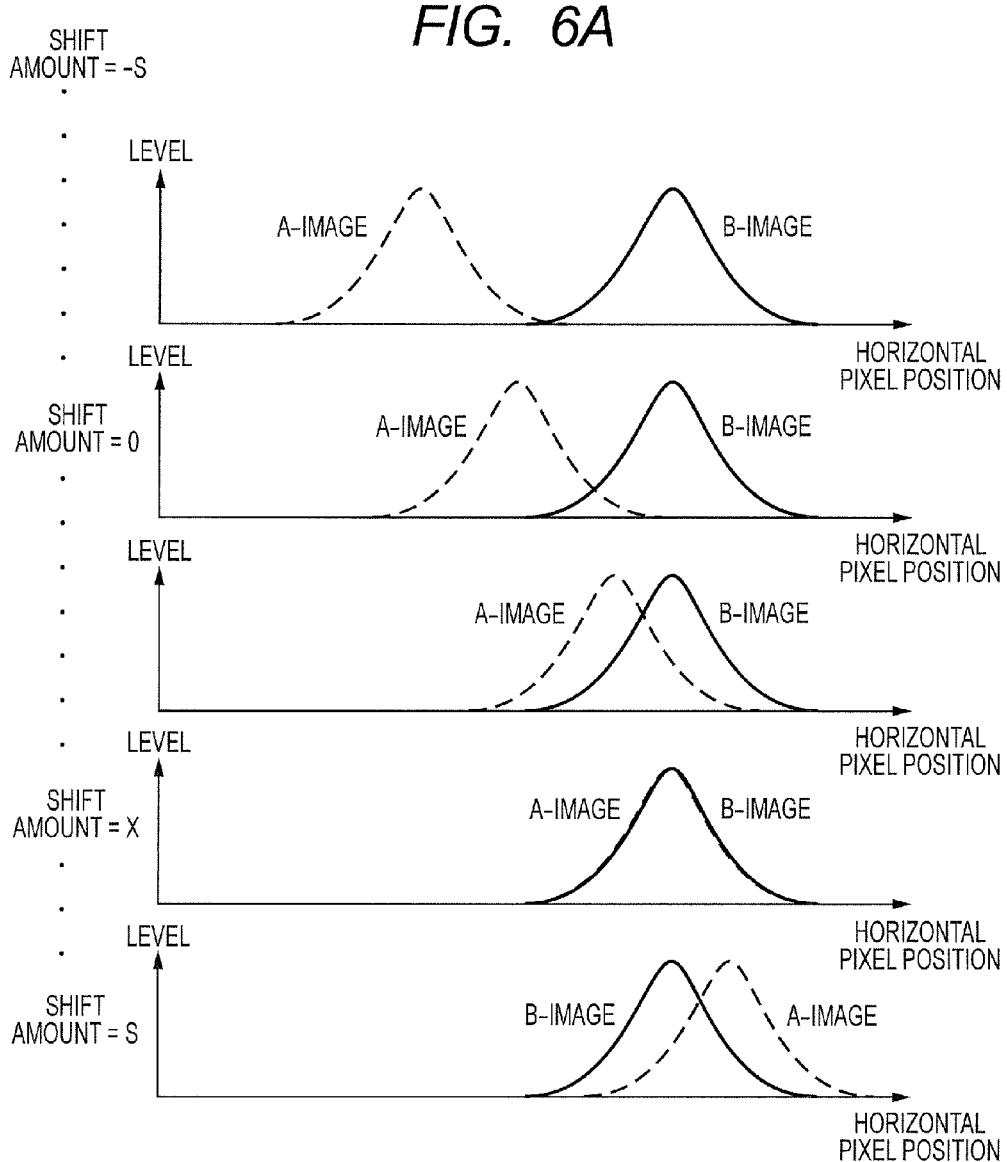
FIGS. 6A and 6B are diagrams illustrating the operation of a correlation operation unit of the focus detection apparatus according to the first embodiment of the invention.
Figure 6B:
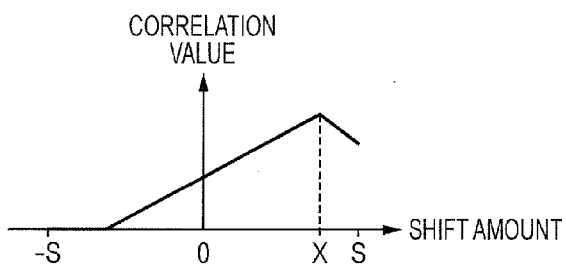

FIG. 5A illustrates the A-image data and the B-image data of one row in the case of the in-focus state as illustrated in FIG. 3A. An axis of abscissa indicates a horizontal pixel position and an axis of ordinate denotes a level of the data. In the in-focus case, the A-image data and the B-image data coincide. FIG. 5B illustrates the A-image data and the B-image data of one row in the case of the defocus state as illustrated in FIG. 3B. At this time, the A-image data and the B-image data have a phase difference due to the state as mentioned above and has an image shift amount X as a deviation of the horizontal pixel position. The A-image data of each division area designated by the operation control unit 432 is input to the correlation operation unit 430 while being shifted and moved in the horizontal direction as illustrated in FIG. 6A. It is assumed here that a sign of a shift amount in the case of shifting the A-image data to the left is "minus", a sign of a shift amount in the case of shifting the A-image data to the right is "plus", and the shift movement of (−s∼s) pixels is performed. At the time of each shift, the corresponding A-image data and B-image data are compared and the data obtained by adding the data in which a value at each position in the horizontal direction is smaller is calculated as a correlation value of one row. In the present embodiment, the calculating method of the correlation value is not limited to such a method. Any calculating method can be also applied so long as it shows a correlation between the A-image data and the B-image data. If a positional relation between the object images of the A-image data and the B-image data is as illustrated in FIG. 3B, when the shift amount is equal to X as illustrated in FIG. 6B, the correlation value becomes maximum. The correlation value of each row in the same division area is added every same shift amount and an addition value is calculated as a correlation value (correlation data) of each shift amount of one division area and written into the memory 433.

Figure 7B:
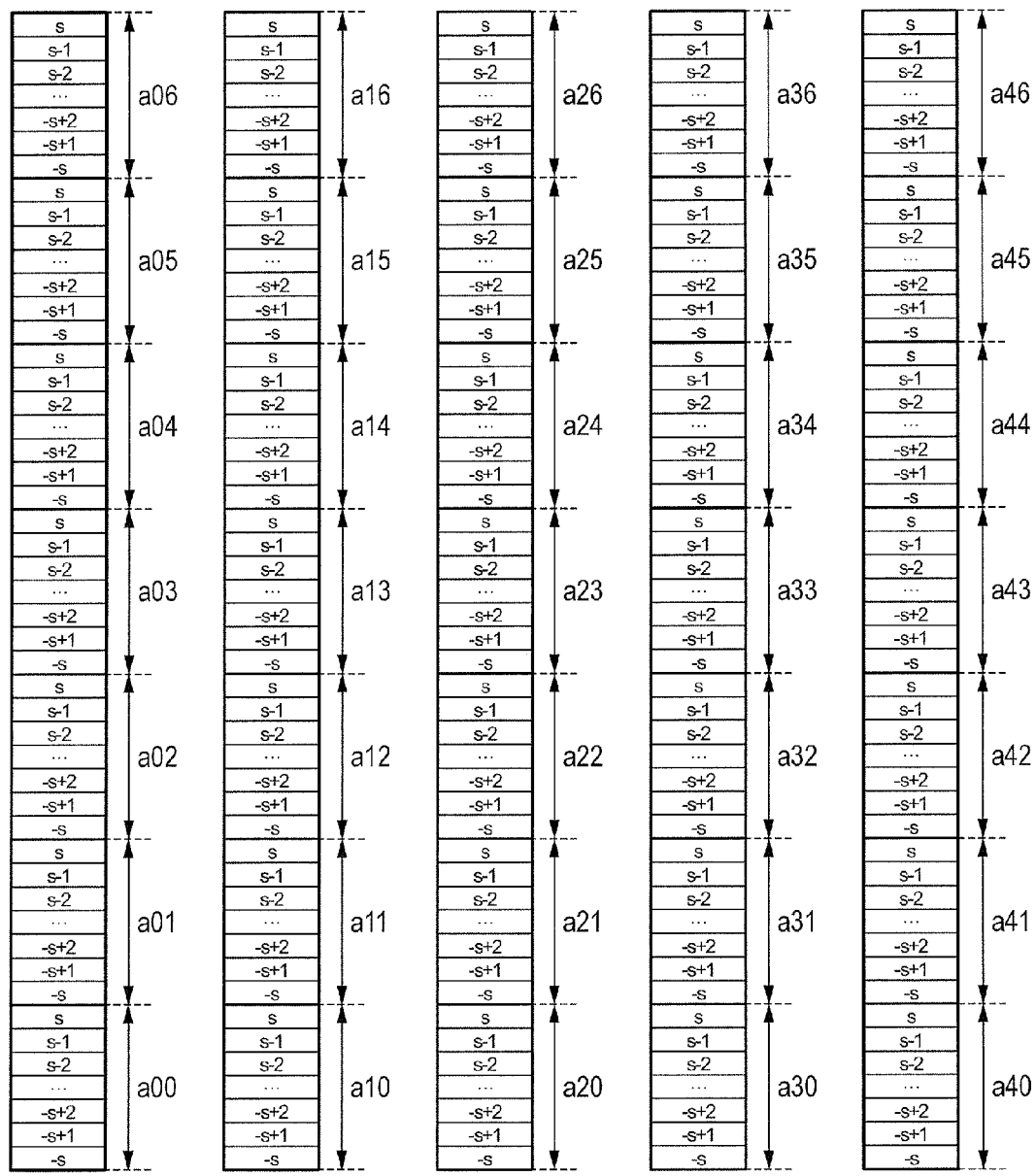

FIG. 7B illustrates a construction of the memory 433. The correlation data of each shift amount (−s∼s) calculated in the correlation operation unit 430 is held for every area of division areas a00 to a46 illustrated in FIG. 7A. When an output command of the correlation data is input from the CPU 103 to the correlation operation unit 120, the correlation data is read out of the memory 433 and is output from the correlation operation unit 120.

At this time, the correlation data of the area set in the AF area by the CPU 103 is added by the addition unit 435. For example, if the apparatus is set so that the correlation data of the areas a00 and a01 are added, the memory control unit 434 controls the memory so as to sequentially read out the correlation data of −s shift of a00 and the correlation data of −s shift of a01 and inputs the read-out data to the addition unit 435. The addition unit 435 adds the correlation data of −s shift of a00 and the correlation data of −s shift of a01 and outputs addition data as new correlation data of −s shift. After that, an addition similar to that mentioned above is sequentially performed like −s+1 shift and −s+2 shift until +s shift and outputs the correlation data of −s∼s shift in which the correlation data of the areas a00 and a01 are added. If the apparatus is set so as to add the correlation data of the areas, the selector 436 selects the b side, so that the data which is output from the addition unit 435 is output from the correlation operation unit 120.

If the apparatus is not set so as to add the correlation data of the areas, the selector 436 selects the a side, so that the correlation data of −s∼s shift of the set area is output as it is from the correlation operation unit 120.

The correlation data which is output from the correlation operation unit 120 is input to the AF operation unit 109. The AF operation unit 109 detects an image shift amount as a shift amount which gives a maximum value of the correlation data of each division area or the area in which the data is added. At the time of the focus driving, which will be described hereinafter, a defocus amount Y is calculated from the shift amount and a drive distance of the third lens group 119 is calculated from Y on the basis of a predetermined calculation.

Figure 8:
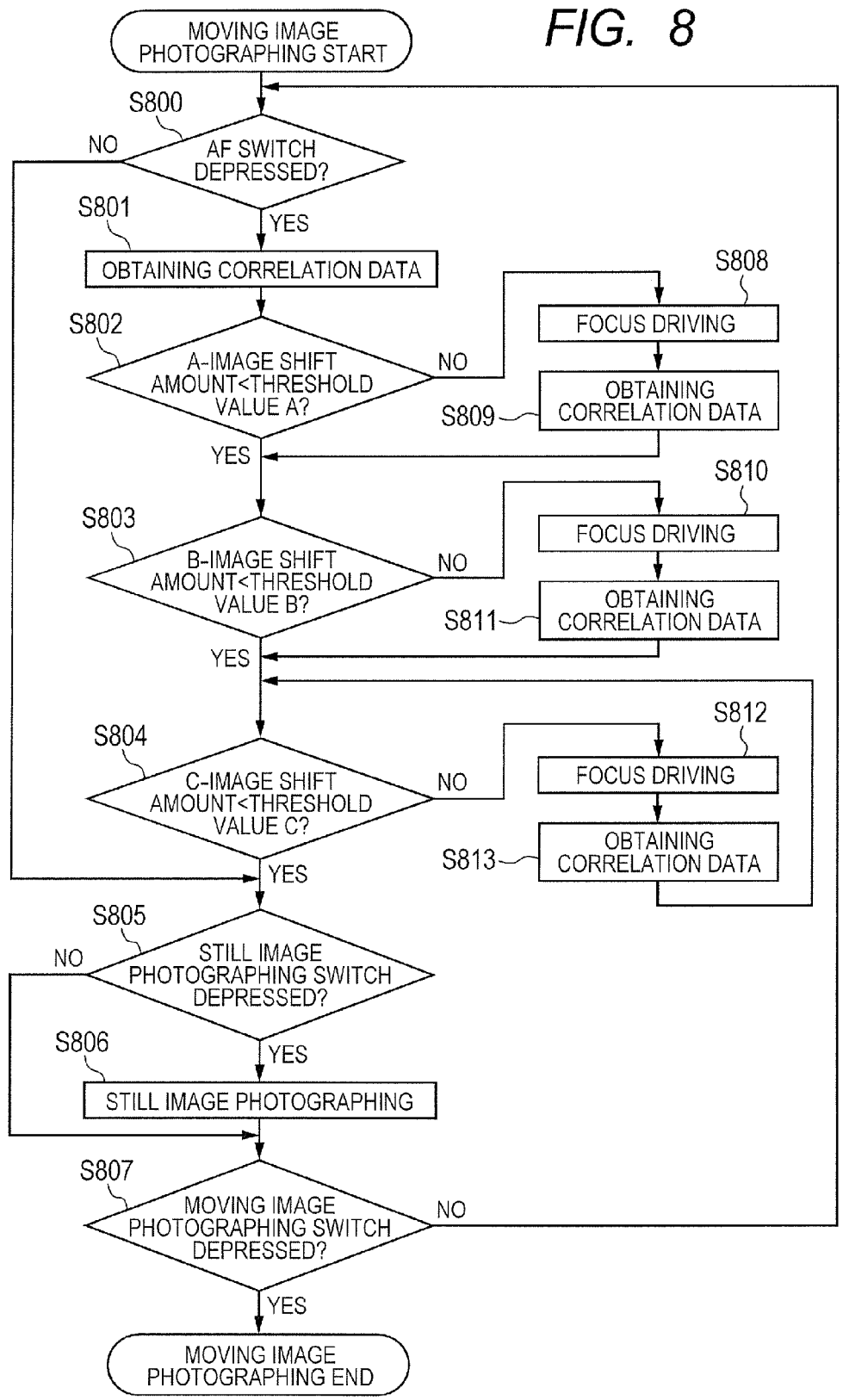
FIG. 8 is a diagram illustrating a flowchart for the photographing operation of the imaging apparatus according to the first embodiment of the invention.

Subsequently, the photographing operation of the imaging apparatus according to the present embodiment will be described with reference to a flowchart of FIG. 8. According to the photographing operation, a still image can be photographed by performing a focus adjustment during the photographing of a moving image.

First, when a moving image photographing switch included in the operation unit 104 is depressed, the moving image photographing is started. When the moving image photographing is started, a power source is turned on to the imaging element 100, AFE 101, and TG 102 and the CPU 103 sets the moving image photographing. After it is set, the TG 102 outputs a read-out pulse to the imaging element 100 on the basis of a sync signal which is output from the CPU 103. The imaging element 100 starts the reading operation at a predetermined frame rate. Although the charge accumulation and reading operation of the moving image are executed by using the electronic shutter function by the slit rolling operation in the present embodiment, the invention is not limited to such an example.

The A-image signal and the B-image signal which are output from the imaging element 100 are converted into digital signals by the AFE 101 and are transferred as A-image data and B-image data to the RAM 106. After that, they are transferred to the image processing unit 108. The A-image data and the B-image data corresponding to the PDs arranged under the same microlens are added for every pixel, thereby forming frame data of the moving image. After that, a correction processing, compression, and the like are executed and the moving image is displayed to the display unit 105 (live view). If the moving image recording is selected by using the menu displayed onto the display unit 105 and the operation unit 104 prior to photographing, the moving images are sequentially recorded into the flash memory 110. The frame data of the moving images is sequentially input to the correlation operation unit 120. A correlation operation of the area designated for every frame by the control of the CPU 103 is executed and a result of the correlation operation is stored into the memory 433.

When the moving image photographing operation is started as mentioned above, in step S800, the CPU 103 discriminates whether or not an AF switch included in the operation unit 104 is depressed. If it is determined that the AF switch is depressed, step S801 follows.

Figures 9A, 9B:
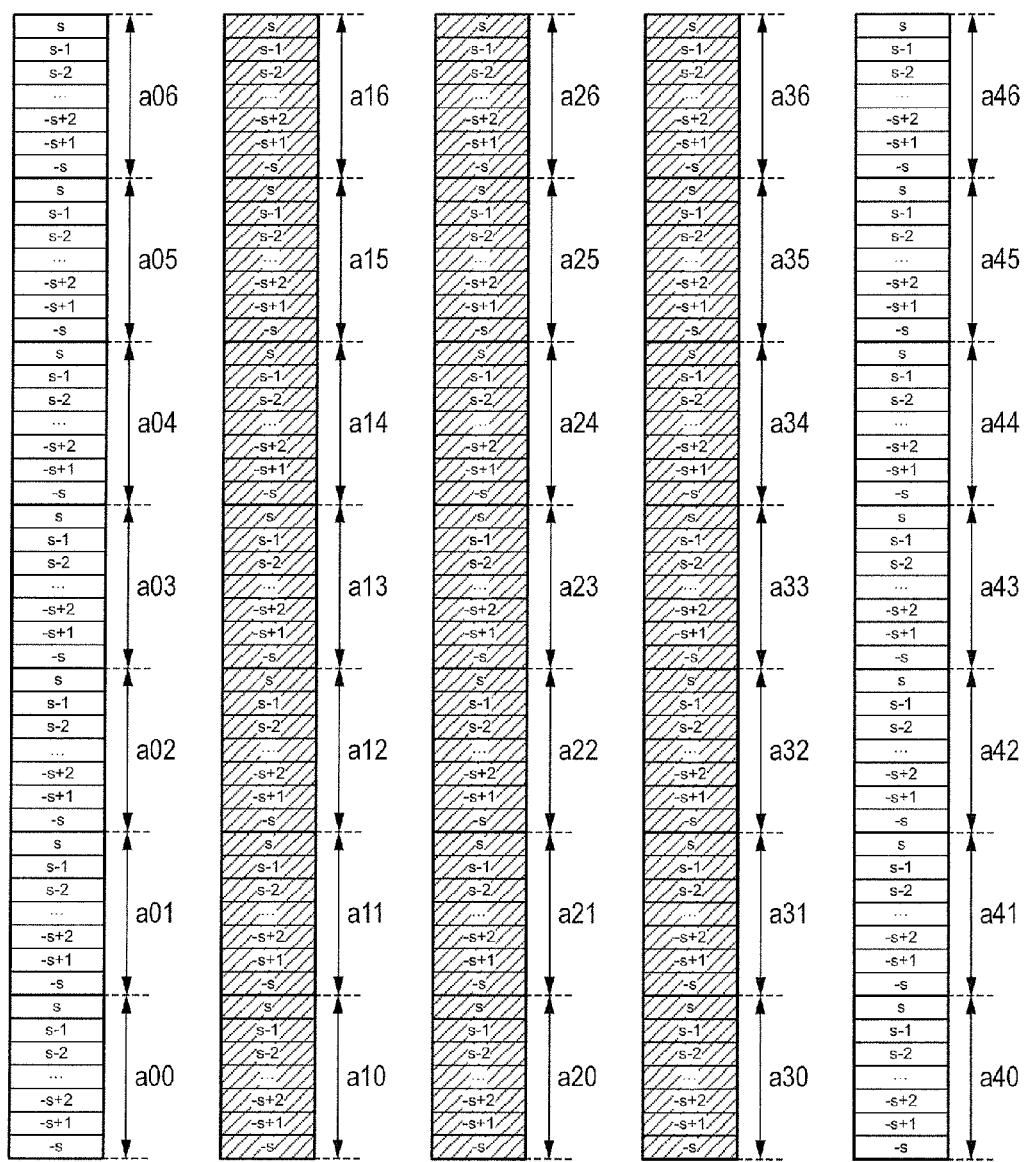
FIGS. 9A and 9B are diagrams illustrating a construction of a focus detection area and the memory to store the correlation data in the focus detection area according to the first embodiment of the invention.

In step S801, the CPU 103 outputs an output command of the correlation data to the correlation operation unit 120 and the correlation operation unit 120 outputs the correlation data which is arithmetically operated to such a frame. In the present embodiment, it is assumed that the correlation data corresponding to three areas including a different number of division areas is generated and sequentially output. In the present embodiment, it is assumed that one of them is the correlation data (correlation data A) in which the data of all division areas of hatched portions illustrated in FIG. 9A is added and another one of them is the correlation data (correlation data B) in which the data of all division areas of hatched portions illustrated in FIG. 10A is added. Further another one of them is the correlation data (correlation data C) of a single division area of a hatched portion illustrated in FIG. 11A.

Figures 11A, 11B:
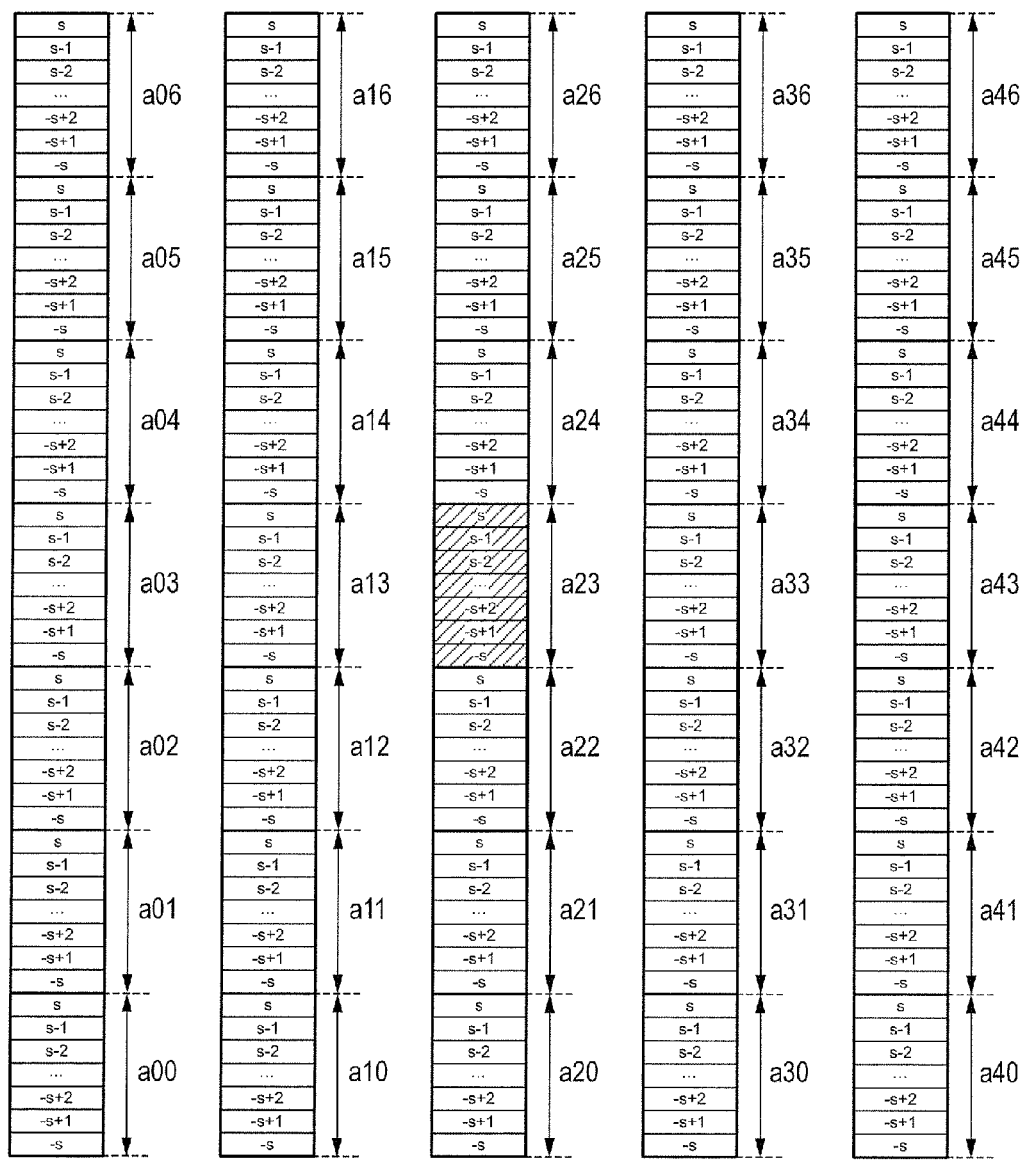
FIGS. 11A and 11B are diagrams illustrating a construction of a focus detection area and the memory to store the correlation data in the focus detection area according to the first embodiment of the invention.
Figure 12:
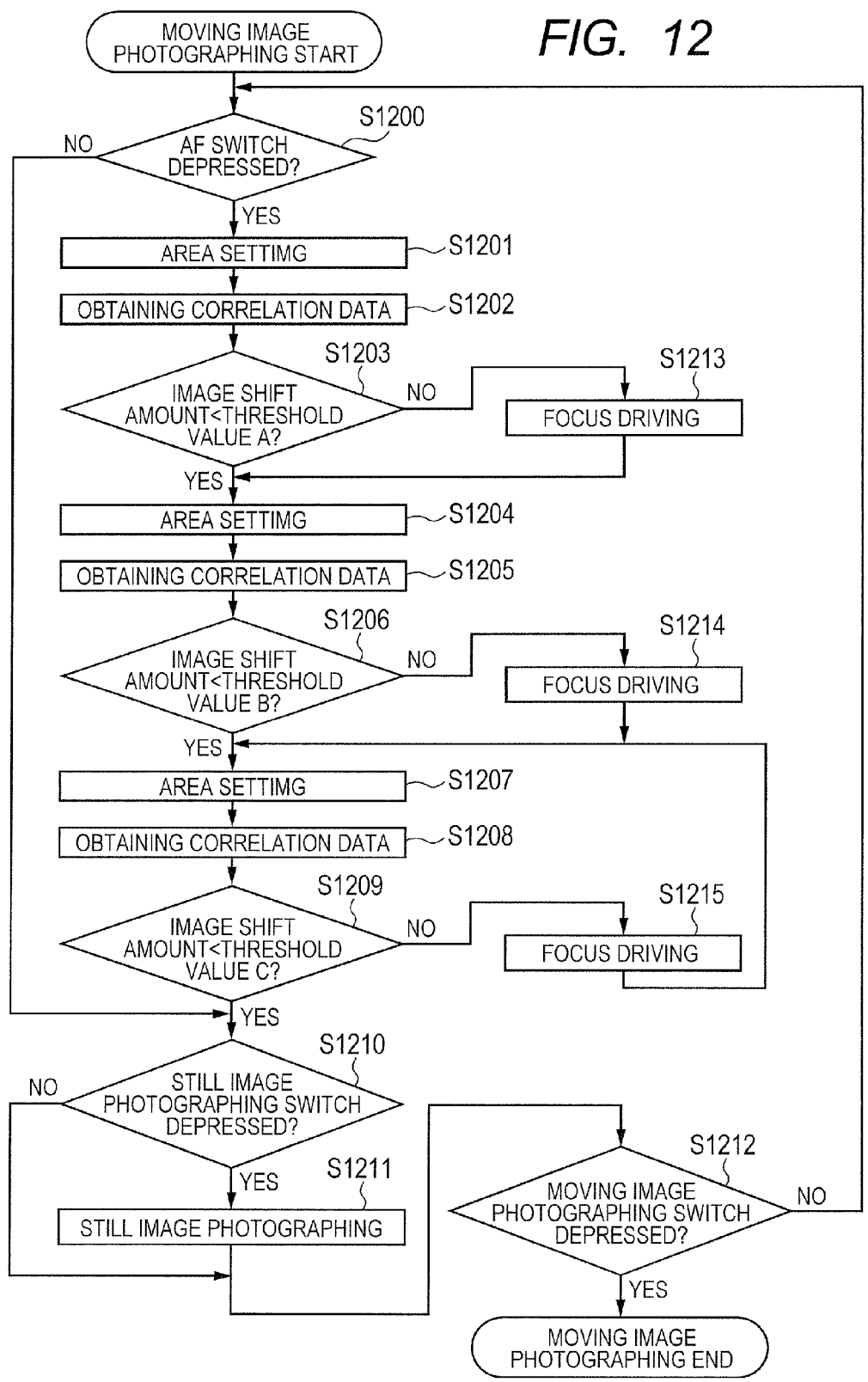
FIG. 12 is a diagram illustrating a flowchart for the photographing operation of an imaging apparatus according to the second embodiment of the invention.

The correlation data A is data in which the correlation data stored in hatched portions in the memory 433 illustrated in FIG. 9B is added and output every –s~s shift. The correlation data B is data in which the correlation data stored in hatched portions in the memory 433 illustrated in FIG. 10B is added and output for every –s~s shift. The correlation data C is data in which the correlation data of –s~s shift stored in hatched portions in the memory 433 illustrated in FIG. 11B is output as it is. The correlation data which is output from the correlation operation unit 120 is input to the AF operation unit 109.

Subsequently, in step S802, the image shift amount calculated from the correlation data A is compared with a preset predetermined threshold value A, thereby discriminating a focus state. When the image shift amount is smaller than the threshold value A, it is determined that the defocus amount is equal to or less than a middle level, and step S803 follows. When the image shift amount is equal to or larger than the threshold value A, it is determined that the defocus amount is large, and step S808 follows.

In step S808, the focus drive unit 112 is driven by using the defocus amount calculated from the correlation data A. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, in step S809, the correlation data A, B, and C after the focus driving are obtained in a manner similar to step S801, and the processing routine advances to step S803.

Subsequently, in step S803, as the next order of discrimination, the image shift amount calculated from the correlation data B is compared with a preset predetermined threshold value B. When the image shift amount is smaller than the threshold value B, it is determined that the defocus amount is small, and step S804 follows. When the image shift amount is equal to or larger than the threshold value B, it is determined that the defocus amount is equal to a middle level, and step S810 follows.

In step S810, the focus drive unit 112 is driven by using the defocus amount calculated from the correlation data B. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, in step S811, the correlation data A, B, and C after the focus driving are obtained in a manner similar to step S801, and the processing routine advances to step S804.

Subsequently, in step S804, the image shift amount calculated from the correlation data C is compared with a preset predetermined threshold value C. When the image shift amount is smaller than the threshold value C, it is determined that the in-focus state is obtained, and step S805 follows. When the image shift amount is equal to or larger than the threshold value C, it is determined that the defocus amount is small, and step S812 follows.

In step S812, the focus drive unit 112 is driven by using the defocus amount calculated from the correlation data C. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, in step S813, the correlation data A, B, and C after the focus driving are obtained in a manner similar to step S801, and the processing routine is returned to step S804. Processings in steps S804, S812, and S813 are repeated until it is determined that the in-focus state is obtained.

In step S805, the CPU 103 discriminates whether or not a still image photographing switch included in the operation unit 104 is depressed. If the still image photographing switch is depressed, in step S806, the CPU 103 interrupts the moving image photographing and executes the still image photographing. After that, the moving image photographing is restarted and step S807 follows. If the still image photographing switch is not depressed, step S807 follows as it is.

In step S807, the CPU 103 discriminates whether or not the foregoing moving image photographing switch is depressed. If the moving image photographing switch is depressed, the moving image photographing is finished. If the moving image photographing switch is not depressed, the processing routine is returned to step S800 and the depression of the AF switch is discriminated.

As mentioned above, according to the embodiment, such an operation that the correlation data of the respective division areas in the area set in the focus detection operation range divided into a plurality of division areas is added and the new correlation data is generated can be executed in a lump with respect to a plurality of different areas which are set. Thus, the focus detection corresponding to the perspective conflict can be performed by the small number of frames. The time which is required until the final in-focus state is obtained can be shortened.

Further, by such a construction that only the correlation data of each divided area is held in the memory and, when the correlation data is output, the data of the selected area is added and the addition data is output, there is no need to hold a plurality of kinds of correlation data and the memory or a circuit scale can be suppressed.

Second Embodiment

A construction of an imaging apparatus to which a focus detection apparatus according to the second embodiment of the invention is applied will be described with reference to FIGS. 12 to 15D. Since the constructions of the focus detection apparatus and the imaging apparatus according to the present embodiment are similar to those in the first embodiment, their description is omitted here. The second embodiment differs from the first embodiment with respect to the operation of the imaging apparatus. The photographing operation of the imaging apparatus according to the second embodiment of the invention will be described hereinbelow with reference to a flowchart of FIG. 12. According to this photographing operation, a still image can be photographed by performing the focus adjustment during the moving image photographing.

First, the moving image photographing switch included in the operation unit 104 is depressed and the moving image photographing is started. Since the moving image photographing operation which is executed until the depression of the AF switch is determined in step S1200 after the start of the moving image photographing is similar to that in the first embodiment, its description is omitted here.

When the moving image photographing operation is started, in step S1200, the CPU 103 discriminates whether or not the AF switch included in the operation unit 104 is depressed. If it is determined that the AF switch is depressed, step S1201 follows. It is now assumed that an AF mode is preset to the imaging apparatus. In the present embodiment, it is assumed that a search mode for detecting the focus position from a wider range of the image than that in a normal mode is set. The CPU 103 sets those focus detection modes in accordance with the operation of the operation unit 104.

In step S1201, the CPU 103 sets the correlation data of which division area is added to output the added data to the correlation operation unit 120. In the search mode in the present embodiment, it is assumed that the whole image is divided into ten areas in the horizontal direction and seven areas in the vertical direction. The number of division areas and the dividing method are not limited to those mentioned above. The apparatus is set in such a manner that among the divided areas, with respect to the nine areas at different positions in the AF area which are shown as hatched portions in FIGS. 13A to 13I and include the same number of division areas, the correlation data of every division area is added and addition data is output.

Subsequently, in step S1202, the CPU 103 outputs a correlation data output command to the correlation operation unit 120. The correlation operation unit 120 outputs the correlation data which is operated by the frame data to the AF operation unit 109. It is assumed that as correlation data at this time, the data corresponding to the nine areas is sequentially output. Correlation data obtained by adding those data with respect to all division areas shown as hatched portions in FIGS. 13A to 13I are assumed to be correlation data A to I, respectively. An image shift amount in each area is calculated with reference to the obtained correlation data A to I. An area in which the image shift amount is smallest is selected from the areas of the hatched portions illustrated in FIGS. 13A to 13I. It is now assumed that, for example, the area of the hatched portion (correlation data F) illustrated in FIG. 13F is selected.

Subsequently, in step S1203, the image shift amount calculated from the correlation data F is compared with the preset predetermined threshold value A, thereby discriminating the focus state of the selected area. When the image shift amount is smaller than the threshold value A, it is determined that the defocus amount is equal to or less than a middle level, and step S1204 follows. When the image shift amount is equal to or larger than the threshold value A, it is determined that the defocus amount is large, and step S1213 follows.

In step S1213, the focus drive unit 112 is driven by using the defocus amount calculated from the correlation data F. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, step S1204 follows.

In step S1204, the CPU 103 sets correlation data of which division area is added to output the added data to the correlation operation unit 120. The apparatus is set in such a manner that with respect to four kinds of areas shown in hatched portions in FIGS. 14A to 14D selected in step S1202 mentioned above and included in the area of the hatched portion in FIG. 13F, the correlation data is added for every area and addition data is output.

Subsequently, in step S1205, the CPU 103 outputs a correlation data output command to the correlation operation unit 120. The correlation operation unit 120 outputs the correlation data which is operated by the frame data. As correlation data at this time, it is assumed that the data corresponding to four areas is sequentially output. Correlation data obtained by adding all data in the areas of the hatched portions illustrated in FIGS. 14A to 14D are assumed to be correlation data J to M, respectively. An image shift amount in the area of each hatched portion is calculated with reference to the obtained correlation data J to M. An area (correlation data) in which the image shift amount is smallest is selected from the areas of the hatched portions illustrated in FIGS. 14A to 14D. It is now assumed that, for example, the area of the hatched portion (correlation data J) illustrated in FIG. 14A is selected.

Subsequently, in step S1206, the image shift amount calculated from the correlation data J is compared with the preset predetermined threshold value B. When the image shift amount is smaller than the threshold value B, it is determined that the defocus amount is small, and step S1207 follows. When the image shift amount is equal to or larger than the threshold value B, it is determined that the defocus amount is equal to a middle level, and step S1214 follows.

In step S1214, the focus drive unit 112 is driven by using the defocus amount calculated from the correlation data F. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, step S1207 follows.

In step S1207, the CPU 103 sets the correlation data of which division area is added to output the added data to the correlation operation unit 120. The apparatus is set in such a manner that with respect to four kinds of areas shown in hatched portions in FIGS. 15A to 15D selected in step S1204 mentioned above and included in the area of the hatched portion in FIG. 14A, the correlation data is output.

Subsequently, in step S1208, the CPU 103 outputs a correlation data output command to the correlation operation unit 120. The correlation operation unit 120 outputs the correlation data which is operated by the frame data. As correlation data at this time, it is assumed that the data corresponding to four areas is sequentially output. Correlation data of the hatched portions in the division areas illustrated in FIGS. 15A to 15D are assumed to be correlation data N to Q, respectively. An image shift amount in the area of each hatched portion is calculated with reference to the obtained correlation data N to Q. An area in which the image shift amount is smallest is selected from the areas of the hatched portions illustrated in FIGS. 15A to 15D. It is now assumed that, for example, the division area of the hatched portion (correlation data O) illustrated in FIG. 15B is selected.

Subsequently, in step S1209, the image shift amount calculated from the correlation data O is compared with the preset predetermined threshold value C. When the image shift amount is smaller than the threshold value C, it is determined that the image is in-focused, and step S1210 follows. When the image shift amount is equal to or larger than the threshold value C, it is determined that the defocus amount is small, and step S1215 follows.

In step S1215, the focus drive unit 112 is driven by using the defocus amount calculated from the correlation data O. That is, the CPU 103 calculates a focus drive distance from the defocus amount and transfers its information to the focus drive unit 112. The focus drive unit 112 controls the driving of the focus actuator 114 on the basis of the drive distance information and drives the third lens group 119 movably backward and forward in the optical axis direction, thereby performing the focus adjustment. After that, step S1207 follows.

In step S1210, the CPU 103 discriminates whether or not the still image photographing switch included in the operation unit 104 is depressed. If the still image photographing switch is depressed, in step S1211, the CPU 103 interrupts the moving image photographing and executes the still image photographing. After that, the moving image photographing is restarted and step S1212 follows. If the still image photographing switch is not depressed, step S1212 follows as it is.

In step S1212, the CPU 103 discriminates whether or not the foregoing moving image photographing switch is depressed. If the moving image photographing switch is depressed, the moving image photographing is finished. If the moving image photographing switch is not depressed, the processing routine is returned to step S1200 and the depression of the AF switch is discriminated.

As mentioned above, according to the present embodiment, by such a construction that the detection area is designated in the wide range of the image, the correlation data is added with respect to the designated area for every obtainment of the correlation data, and addition data is output, the correlation data of a larger number of area patterns corresponding to the operation situation can be obtained. Thus, in the AF or the like of the search mode, it is possible to cope with the focus detection of a larger number of areas, the perspective conflict, and the like by using the small number of frames, and the time which is required until the in-focus state is obtained can be shortened. Since only the correlation data of each divided area is held in the memory and, a scale of the memory can be suppressed and the number of patterns of the area to be output can be increased.

Although the operation in the AF search mode has been described in the present embodiment, the invention is not limited to it. The invention may be constructed in such a manner that a plurality of AF modes are provided and an area in which the data is added at the time of obtaining the correlation data is changed in accordance with the mode.

As mentioned above, according to the invention, the focus detection apparatus and imaging apparatus in which the results of the focus detection operations in a larger number of different focus detection areas can be obtained by a smaller number of frames and the time which is required until the final in-focus state is obtained can be shortened can be provided.

Although the exemplary embodiments of the invention have been described above, the invention is not limited to those embodiments but many various modifications and variations are possible within the scope of the gist of the invention.

Other Embodiments

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-086767, filed on Apr. 17, 2013, which is hereby incorporated by reference herein in its entirety.

What is claimed is:

1. A focus detection apparatus comprising:
   a processor; and
   a memory,
   wherein said processor is configured to operate as:
      a setting unit configured to set a focus detection area; and
      an operation unit configured to calculate correlation of first image data and second image data, and to output a plurality of first correlation data which are a result of the correlation calculation, the plurality of the first correlation data respectively corresponding to a plurality of division areas of an image sensor,
   wherein said memory is configured to hold the plurality of first correlation data output from the operation unit, and
   wherein said processor is further configured to operate as:
      a generation unit configured to generate second correlation data from selected first correlation data among the plurality of first correlation data stored in the memory, in accordance with the focus detection area set by the setting unit; and
      a determining unit configured to determine focus states using the second correlation data.

2. The focus detection apparatus according to claim 1, wherein the setting unit sets the plurality of first areas including a different number of division areas,
   wherein the operation unit calculates and outputs the first correlation data of each division area from the pixel data of one frame, and
   wherein the determining unit determines the focus states of the plurality of first areas on the basis of the second correlation data generated from the first correlation data which is calculated from the pixel data of one frame.

3. The focus detection apparatus according to claim 1, wherein the plurality of different first areas are areas including a different number of division areas,
   wherein the setting unit sets a plurality of second areas including the same number of division areas to different positions in the focus detection area,
   wherein the generation unit selects one of the plurality of second areas as one of the first areas on the basis of the second correlation data, and
   wherein the determining unit determines the focus state of the selected first area on the basis of the corresponding second correlation data.

4. The focus detection apparatus according to claim 1, wherein said processor is further configured to operate as an obtaining unit configured to obtain pixel data of an object captured by an imaging unit that includes an image sensor and a photographing optical system with a pupil division optical element,
   wherein the determining unit detects an image shift amount of the image of the object on the basis of the second correlation data and determines the focus state by comparing the image shift amount with a predetermined value,
   wherein the focus detection apparatus further comprises a focus adjustment unit that includes an actuator and is configured to perform a focus adjustment based on the image shift amount in accordance with a result of the determination, and
   wherein after the focus adjustment unit performs the focus adjustment, a new frame of pixel data is obtained.

5. The focus detection apparatus according to claim 4, wherein when the image shift amount is smaller than the predetermined value, the focus adjustment by the focus adjustment unit is not performed but the determining unit determines the focus state of another area.

6. The focus detection apparatus according to claim 1, wherein the focus detection apparatus has different focus detection modes, and the setting unit changes a setting of an area in accordance with the focus detection mode.

7. An imaging apparatus comprising:
   an imaging unit that includes an image sensor and a photographing optical system, the photographing optical system forming an optical image of an object and including a pupil division optical element that divides a pupil of the photographing optical system, and the image sensor outputting pixel data corresponding to each optical image of the object which passed through different exit pupils of the photographing optical system;
   the focus detection apparatus according to claim 1 for obtaining the pixel data and performing the focus detection; and
   a drive unit that includes an actuator and which is controlled by the focus detection apparatus and drives the photographing optical system.

8. The imaging apparatus according to claim 7, wherein the pupil division optical element is a microlens array in which a plurality of microlenses are two-dimensionally arranged,
   wherein the image sensor has a plurality of pixels which are two-dimensionally arranged in a pixel array area,
   wherein each of the pixels includes a plurality of photoelectric conversion units divided for each microlens, and
   wherein the plurality of photoelectric conversion units construct a first photoelectric conversion unit configured to receive a ray of light which passes through a first area of the exit pupil of the photographing optical system to be pupil-divided and a second photoelectric conversion unit configured to receive a ray of light which passes through a second area deviated from the first area of the exit pupil to be pupil-divided.

9. The imaging apparatus according to claim 7, wherein the pupil division optical element is a microlens array in which a plurality of microlenses are two-dimensionally arranged,
   wherein the image sensor has a plurality of pixels which are two-dimensionally arranged in a pixel array area, and
   wherein the plurality of pixels include a first pixel containing a first photoelectric conversion unit configured to receive a ray of light which passes through a first area of the exit pupil of the photographing optical system to be pupil-divided and a second pixel containing a second photoelectric conversion unit configured to receive a ray of light which passes through a second area deviated from the first area of the exit pupil to be pupil-divided.

10. The imaging apparatus according to claim 8, further comprising an image processor configured to generate first image data obtained by adding pixel signals of the photoelectric conversion units constructing the first photoelectric conversion unit and generate second image data obtained by adding pixel signals of the photoelectric conversion units constructing the second photoelectric conversion unit,
  wherein said processor is further configured to function as an obtaining unit configured to obtain pixel data of an object captured by said imaging unit, and
  wherein the obtaining unit obtains the first image data and the second image data as the pixel data.

11. The imaging apparatus according to claim 8, wherein said processor is further configured to function as a setting unit configured to set a focus detection mode held in the focus detection apparatus.

12. A focus detection method, comprising:
  setting a focus detection area;
  calculating correlation of first image data and second image data, and outputting a plurality of first correlation data which are a result of the correlation calculation, the plurality of the first correlation data respectively corresponding to a plurality of division areas of an image sensor;
  generating second correlation data from selected first correlation data among the plurality of first correlation data, in accordance with the focus detection area set in the setting; and
  determining focus states using the second correlation data.

13. A non-transitory computer-readable storage medium storing a program for controlling a focus detection apparatus, wherein the program comprises program code for causing a computer to perform a method comprising:
  setting a focus detection area;
  calculating correlation of first image data and second image data, and outputting a plurality of first correlation data which are a result of the correlation calculation, the plurality of the first correlation data respectively corresponding to a plurality of division areas of an image sensor;
  generating second correlation data from selected first correlation data among the plurality of first correlation data, in accordance with the focus detection area set in the setting; and
  determining focus states using the second correlation data.

14. The focus detection apparatus according to claim 1, wherein the focus detection area is divided into a plurality of areas in accordance with the division areas.

15. The focus detection apparatus according to claim 1, wherein the setting unit sets the plurality of focus detection areas of differing size.

* * * * *